United States Patent
Ries

[15] 3,678,527
[45] July 25, 1972

[54] DEVICE FOR AUTOMATICALLY CLEANING VEHICLES

[72] Inventor: Gotfried Ries, Kriegsstr 236, 75 Karlsruhe, Germany

[22] Filed: Nov. 4, 1970

[21] Appl. No.: 86,860

[30] Foreign Application Priority Data
Nov. 8, 1969 Germany..................P 19 56 385.6

[52] U.S. Cl. ..............................................15/99, 15/DIG. 2
[51] Int. Cl. .......................................................B60s 3/06
[58] Field of Search.................15/99, 98, 97, 53, 21 D, 21 E, 15/4, DIG. 2; 34/9, 95; 134/6, 9, 32

[56] References Cited
UNITED STATES PATENTS
| | | | |
|---|---|---|---|
| 3,405,453 | 10/1968 | Ries | 34/9 |
| 2,579,866 | 12/1951 | Rousseau | 15/DIG. 2 |
| 3,497,895 | 3/1970 | Oldham et al | 15/21 D |

Primary Examiner—Leon G. Machlin
Attorney—Allison C. Collard

[57] ABSTRACT

A device for automatically washing vehicles, such as motor vehicles and the like, consisting of a frame member supporting a plurality of adjacent endless belts having washing elements which rotate toward the vehicle. The washing elements move upwardly and downwardly in cooperation with the contoured surfaces of the vehicle and laterally reciprocate with respect to each other over the vehicle surfaces.

11 Claims, 10 Drawing Figures

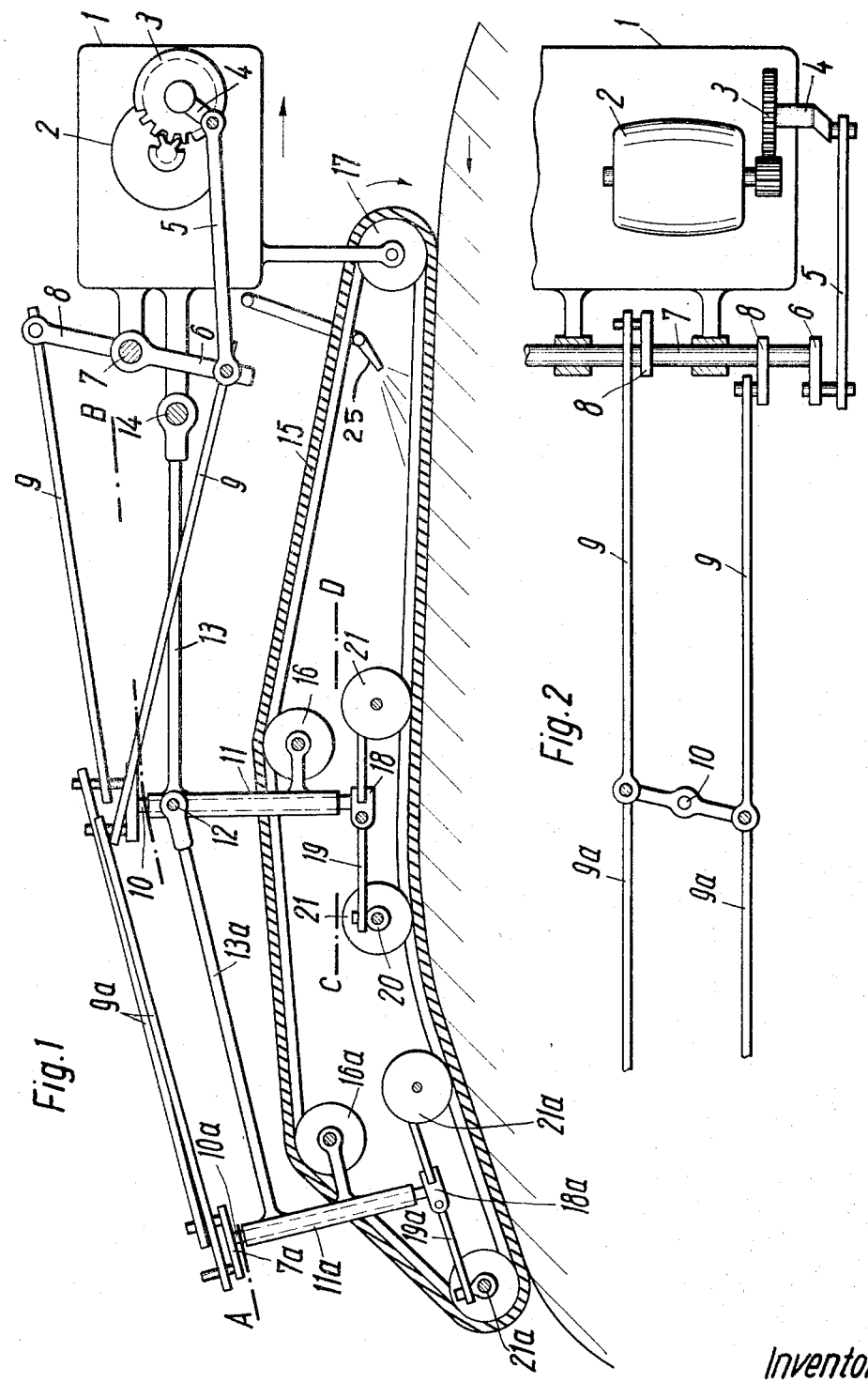

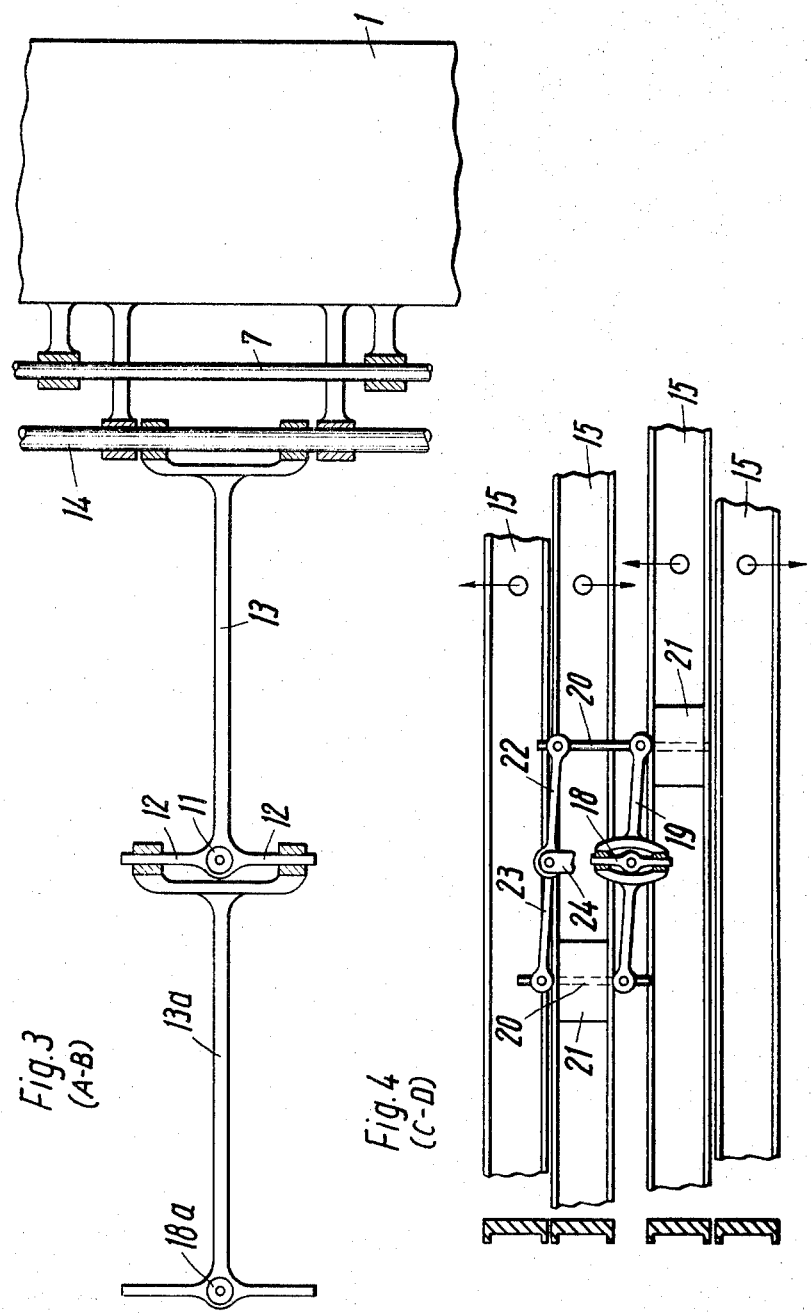

PATENTED JUL 25 1972 3,678,527

Inventor:
GOTTFRIED RIED

DEVICE FOR AUTOMATICALLY CLEANING VEHICLES

The present invention relates to a device for automatically cleaning and washing vehicles.

In order to wash heavily soiled and oily vehicles, particularly motor vehicles, railroad cars, trams and the like, mechanical washing means are generally needed. Such washing is generally performed by conventional devices with large rotating brushes. In such devices, one brush is moved across the roof, and the other brush is moved along one of the sidewalls of the vehicle. However, motor vehicles do not have even or smooth side walls, but small extending or indented faces and protruding parts such as, for example, mirrors, head lights, door handles, bumpers and the like. The above mentioned unevenness on such vehicles could only be overcome by brushes with extra long bristles or foam rubber strips. However, in order to exert sufficient pressure on these extra long bristles, the bristles had to be sufficiently hard which often resulted in damaging the sensitive paint on the vehicles, and scratching the paint in most cases. Furthermore, the brushes were rotated with a rather high rotational speed so that mirrors, antennas, windshield wipers and ornamental devices were often torn off from the vehicle.

A washing device is known wherein the washing elements consist of large relatively flat sponge bodies which engage the vehicle and are reciprocated along the vehicle. Furthermore, a washing device is known which essentially consists of a cleaning cloth which is pressed against the vehicle by means of water hoses. However, all the conventional devices are disadvantageous in that all the smaller corners, indentations, etc. cannot be adequately cleaned. A device is known wherein a series of brushes or sponges are mounted on flexible arms. The flexible arms are mounted on a moveable shaft which is moveably mounted in the frame. The entire frame is moved by a shaking device. This device is disadvantageous because vibrations are transmitted to the immediate surroundings, so that a defined and intensive movement of the washing elements is not possible, because of the long transmitting path of the connecting rods.

The present invention overcomes the disadvantages of the above mentioned devices by providing a device for automatically cleaning vehicles, and particularly motor vehicles, whereby washing elements are moved toward the vehicle. A plurality of adjacent washing elements are guided on endless belts. The washing elements are mounted on a frame or an associated box. Each individual washing element is moveable upwardly and downwardly with respect to the unevenness of the vehicle surface. The washing elements are reciprocated over the surface of the vehicle. The washing elements are guided by one shaft and are reciprocated laterally with respect to the vehicle. With this device, a plurality of individual small washing belts are moved slowly with respect to the vehicle while simultaneously being moved in a lateral reciprocating direction with respect to the vehicle. The washing elements may consist of rollers having short brush bristles, sponges, or foam rubber coverings. The washing elements may consist of small washing belts mounted on endless belts. These individual washing elements engage the surface of the vehicle independently from each other. In order to clean the uneven structure and indentations of a vehicle, a plurality of individual rollers or belts may be used, instead of washing belts mounted on an endless belt. For this purpose, it would normally be necessary to provide individual drives for each washing element which would render the device too expensive. Furthermore, the brushes and/or foam rubbers rollers would be subjected to extraordinary wear and tear.

In the present invention, the rollers or belts which are required for intensive cleaning are moved slowly forward, but are reciprocated swiftly in a lateral reciprocating movement.

This reciprocating movement is gentle on the paint and permits an intensive cleaning of the vehicle surface. Furthermore, it is simpler to transmit a reciprocating movement instead of a rotating movement as is known in the convention devices.

In a preferred embodiment of the invention, the device consists essentially of one or a plurality of frames or metal boxes which are slowly moved over the vehicle. The frame or boxes may also be suspended from the ceiling while the vehicle is slowly moved under the frames or boxes. Preferably, three frames are used, one for the roof of the vehicle, and one for each side of the vehicle. A motor with a reduction drive is mounted in these frames, having a crank which transmits the rotating movement to a shaft which reciprocates. From this shaft, the reciprocating movement is transmitted to a plurality of adjacent shafts, preferably shafts which are arranged in series with respect to each other. These shafts each move two rollers over the vehicle, whereby the rollers are covered with brushes or foam rubber material. The rollers may also guide two washing belts in reciprocating movement over the vehicle.

It is also possible with a further embodiment of the invention to provide a plurality of smaller washing belts which would run over joints, positioned in series with respect to each other. The belts would consist of sponges or foam rubber material. All rollers which are attached to one frame are guided by one shaft. Thus, a large number of very small washing belts can be arranged in a side-by-side relationship. This permits the individual belts to engage uneven surfaces of the vehicle.

The brushes, sponges, or washing belts can also be suspended from flexible arms, instead of running them over rollers. Thereby, the shaft together with the individual flexible arms can be reciprocated. However, it is more advantageous to control the reciprocating movement and bring it as close as possible to the vehicle, a feature which could not be achieved with a free swinging suspension arrangement. A controlled reciprocating movement of the washing elements prevents vibrations. Furthermore, vibrations are held to a minimum in accordance with the subject invention, due to the rods and counterweights which balance each other. A much better cleaning is thus achieved with the controlled reciprocating movement.

Conventional methods of washing, using large rotating brushes, have the disadvantage that the uneven surfaces of the vehicle are not reached. Furthermore, because of the required high rotational speed, the water which is guided to the brushes is driven away from the surface of the vehicle due to the centrifugal force of the rotating brushes. This results in a high water and detergent consumption, or the detergent is diluted to a point where it is no longer effective. With the inventive device, however, the detergent remains for a certain period of time in contact with the surface of the vehicle. Therefore, highly concentrated detergents may be used for a shampoo cleaning. It should also be noted that more time is spent for softening the accumulated dirt, due to the slow movement of the vehicle. In conventional devices, the brushes contact the surface only for a fraction of a second because of their high speed. In accordance with the inventive device, a shampooing zone is provided and water is applied at a later stage.

In accordance with the inventive device, the simple transmission elements permit a slow forward movement of the washing elements over the vehicle, as well as fast lateral reciprocating movements. Due to the fact that these movements are transmitted to a plurality of individually arranged washing elements, it is possible to reach hard to clean areas. The invention is provided with a plurality of individual washing elements. However, it is advantageous to use individual washing belts which are guided by rollers and moved over the vehicle while simultaneously being moved in a lateral reciprocating movement.

In a special embodiment of the invention, most of the moving parts may be mounted on rubber bearings, since only minor movements exist at the bearings and therefore the bearings are not subjected to wear and tear. The washing belts can slowly roll over the vehicle when the vehicle is slowly moved under the frames or boxes of the cleaning device. The cleaning elements may also be driven by separate drive means to speed the movement of the cleaning elements, if so desired. This facilitates the movement of the cleaning elements over obstacles and protrusion on the vehicle.

It is therefore an object according to the present invention to provide a device for automatically washing vehicles and the like utilizing a plurality of adjacent washing elements guided on endless belts mounted on a frame and moving upwardly and downwardly over the surfaces of the vehicle.

It is another object of the present invention to provide a device for automatically washing vehicles which is simple in design, and reliable and efficient in operation.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention.

In the drawings, wherein similar reference characters denote similar elements throughout the several views:

FIG. 1 is a side view of one embodiment of the device in accordance with the invention;

FIG. 2 is a plan view of the drive with a crank and the crank shaft, as well as with rods and joints which are moved thereby;

FIG. 3 is also a plan view below line A–B of FIG. 1;

FIG. 4 is a plan view below line C–D on a part of the joint which transmits the reciprocating movement onto guide rollers and onto washing belts;

Figure 5:
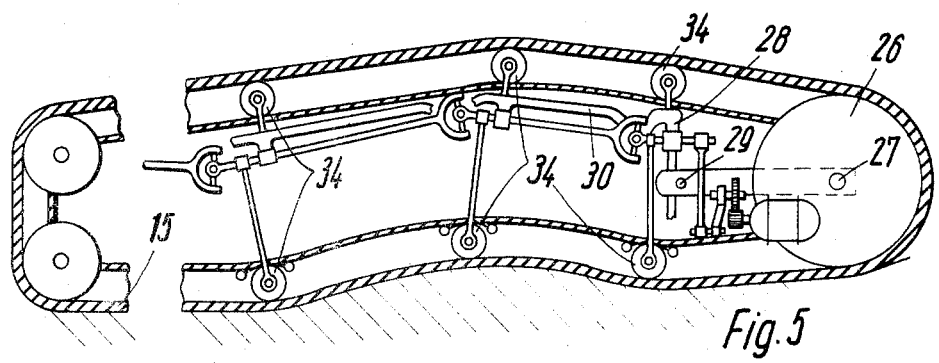
FIG. 5 is a further embodiment of the suspension and guide for the washing belts in side view.

In FIGS. 1 and 2, a drive motor 2 is mounted in a housing 1. Motor 2 drives connecting rod 5 in a reciprocating movement by means of gear drive 3 and crank rod 4. Connecting rod 5 is pivoted at its end on an arm 6 which transmits the reciprocating movement to a shaft 7. Shaft 7 extends across the total area of the vehicle to be washed.

As can be seen in FIG. 2, a number of further arms 8 are mounted on shaft 7 which transmit the reciprocating movement across one or more pull rods 9, and onto a shaft 10 which is formed like a fork. A single pull rod 9 for shaft 7 would be sufficient to achieve the purpose of the device in accordance with the invention. However, in order to avoid heavy vibrations of the total device, two rods 9 and one two-armed lever 8 are preferably provided to balance the reciprocating mass.

Shaft 10 runs or pivots in a substantially vertical pipe 11, having a transverse bolt 12. A fork-like rod 13 is fixedly mounted on pipe 11 and is rotatably mounted on a shaft 14. This is shown in detail in FIG. 3. The wide fork-like guide is effective in that joints 11 and 13, and other joints move with respect to the vehicle. For instance, when the frame runs horizontally over the roof of the vehicle, the joints move vertically in a reciprocating movement and adjust to the unevenness of the vehicle.

In the illustrated embodiment, a further fork-like joint 13a is rotatably mounted on the traverse running bolt 12, and is rigidly mounted on a further pipe 11a. A further vertical shaft 10a which is formed like a fork at its upper portion runs in pipe 11a, and is connected with the fork-like part of shaft 10 by further rods 9a. Naturally, further pipe-like joints and shafts running therein may also be provided, provided that it is practical.

As illustrated in FIGS. 1 and 4, a plurality of washing belts 15 run over a plurality of rollers. Each of the endless washing belts 15 run over rollers 16 and 16a, respectively. The rollers are mounted on pipes 11 and 11a, respectively. The washing belt also runs over a return roller 17 which is mounted at the frame of the device or an associated metal box. Return roller 17 may extend across the total width of the frame, and if required, could be additionally driven so that the washing belts can easily overcome obstacles.

A joint in the lower part of fork-like shaft 11 is shown in FIGS. 1 and 4. The lower end of shaft 11 engages traverse bolt 18 which transmits the oscillating movement of the shaft to a rod 19. The outer ends of rod 19 transmit a precisely defined lateral reciprocating movement to shafts 20 and to guide rollers 21.

Rod 19 see-saws about bolt 18 of shaft 10, so that rollers 21 move separately upwardly and downwardly in order to adjust to the unevenness of the vehicle body. Therefore, rollers 21 may run in series with respect to each other on the same washing belt 15, and the washing belt can move laterally in a reciprocating movement. Preferably, rollers 21 are arranged in such a fashion that each roller moves a separate washing belt, so that each pair of washing belts move with respect to each other in a reciprocating movement, in the direction of the arrows.

In order to prevent the two rollers 21 from being twisted with respect to the washing belts and to enable their shafts 20 to be reciprocated, shafts 20 are pivotably mounted in the ends of rods 22 and 23, while the other ends are rigidly mounted on a lever 24 which is rigidly connected to pipe joint 11 so that rods 19, 22, 20 and 24 form a parallelogram. Accordingly, guide rollers 21 and 21a are mounted and guided at shafts 11a.

It should be noted that washing belts 15 may be eliminated, and rollers 21 and 21a which reciprocate laterally, may be formed into washing elements. For instance, these rollers may be surrounded by foam rubber, or brushes may be attached thereto. Washing liquid may be constantly applied to the washing belt through a feeding pipe by means of jet nozzle 25.

When the device is inoperative, the jet nozzle may be used for cleaning the washing belt by applying an increased water pressure to the nozzle. Naturally, squeezing elements may be provided at the washing belt for cleaning purposes, and are not shown in this particular embodiment.

Lever arm 4, at the crank drive, or arm 6 at shaft 7 may be adjustable, that is, the arms may be extended or shortened, so that the reciprocating movement is just sufficient to exert a strong enough frictional force of the washing element against the vehicle in order to clean the surface of the vehicle.

The oscillating movement of the washing belts, rollers, brushes and the like, may be produced by a shaft which is connected by a plurality of universal joints instead of reciprocating rods. When universal joints are used, the shaft is turned back and forth only to the extent necessary to reciprocate the rollers or washing belts.

In FIG. 5, the suspension and the guide of each of the plurality of washing belts can be seen in a side view. The large guide roller 26 which is associated with each washing belt is mounted on shaft 27. Shaft 27 is mounted on frame 28. To obtain a better adjustment to the unevenness of the vehicle, the axis of each of the large guide rollers may be mounted yieldingly at point 29, and may pivot about that point, in order to yield to small and high obstacles, while allowing the total frame to move over wide obstacles.

Figure 6:
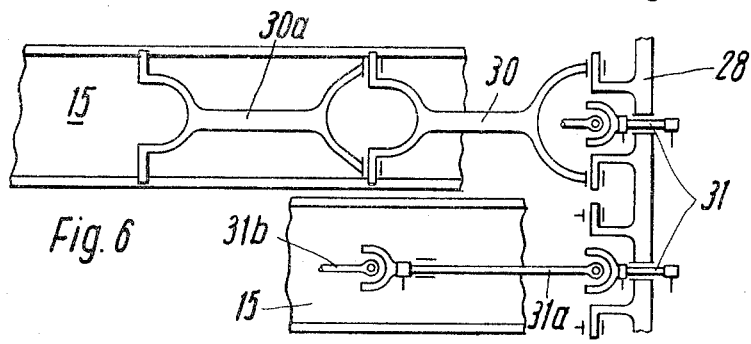
FIG. 6 shows two of the upper washing belts; however, only the articulated arms of the joint are arranged in series with respect to each other.

With the assistance of roller 26, the belt which moves relative to the vehicle, climbs over all obstacles on the vehicle. The first upwardly and downwardly moving joint arm 30 is mounted on frame 28, while all further joint arms 30a, 30b, and so on, are rotatably mounted in series with respect to each other at the position of the preceding joint arm, as can be seen in FIG. 6. In order to prevent the total washing device from vibrating excessively, the universal joints do not turn in one direction, but two shafts always turn opposite with respect to each other. To achieve this, the first part of the universal joint 31 is mounted on frame 28, while all further parts 31a, 31b, etc., are mounted on the associated joint arms 30, 30a, 30b, etc., in such a manner that the pivot axes of the joint arms and the center of the associated universal joints are arranged along one line.

Figures 7, 8:
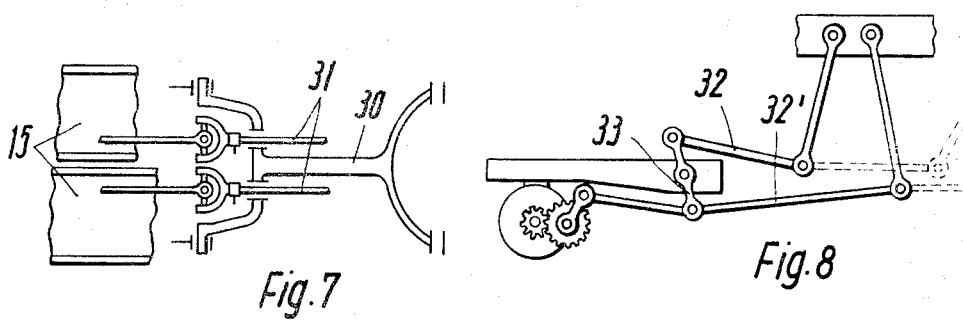
FIG. 7 shows two washing belts each with two universal joints which are mounted on corresponding articulated joint arm.
FIG. 8 shows the drive of the universal joint of FIG. 7.

FIG. 7 shows two washing belts 15 each having two universal joints 31, mounted on a joint arm 30.

FIG. 8 shows the drive of these two universal joints which are reciprocated by rods 32 and 32' in opposite directions with respect to each other. For this purpose, a complete ball or slide bearing 33 is provided at the crank. The illustrated embodiment is advantageous in that a plurality of joints or joint arms, respectively, which are arranged in series with respect to each other, can be easily angled. In this way, the joints or joint arms move like a chain over all the unevenness of the vehicle surface, such as the front side, the roof and the back side of the chassis. The reciprocating movement of the universal joints can be transmitted to rollers 34 by means of simple levers. Rollers 34 guide the washing belt. The shaft is reciprocated in the bearing only partially. The bearings may thus be constructed of rubber, since no lubrication is required.

The side-by-side arrangement of the universal joints, which move with respect to each other and make it possible to balance all reciprocating masses, is illustrated in FIGS. 7 and 8.

Figure 9:
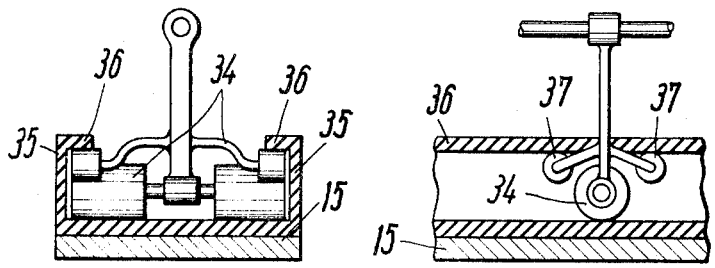
FIG. 9 is a sectional view of the guide for the washing belt in one embodiment of the invention.
Figure 10:
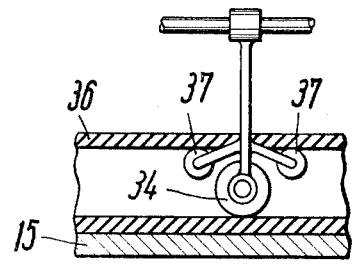
FIG. 10 is a longitudinal sectional view of the embodiment according to FIG. 9.

FIGS. 9 and 10 show an enlarged cross-sectional, longitudinal profile of a further embodiment for guiding washing belt 15. Washing belt 15 is provided with side edges 35, and upper edges 36 at the upper portion thereof disposed perpendicular to edges 35. Edges 36 of the endless belts engage and move small rollers 37 in an opposite direction to the movement of guide rollers 34. The small rollers 37 retain the washing belt in a vertically upward direction. In order to prevent unwashed spaces between the washing belts, the joint arms which are arranged in series with respect to each other may be slightly offset with respect to each other so that the entire chain moves somewhat obliquely with respect to the vehicle.

While only a few embodiments of the present invention have been shown and described, it should be obvious that many changes and modifications may be made thereunto without departing from the spirit and scope of the invention.

What is claimed is:

1. Apparatus for automatically washing motor vehicles and the like, comprising:
   a frame member;
   a plurality of pivotably mounted, endlessly moving washing elements, disposed adjacent one another, and moveable vertically independently of each other for accomodating vertical unevenness of the vehicle being washed;
   at least one cylindrical shaft, pivotably mounted on said frame member;
   at least one pair of push rods, coupled to said shaft;
   at least one joint, coupled to said push rods and to said washing elements, for coupling said push rods to said washing elements; and
   means, coupled to said shaft, for reciprocating said shaft and push rods, and moving said washing elements laterally with respect to each other over the surface of the vehicle.

2. The apparatus as recited in claim 1, wherein said reciprocating means comprises,
   a crank drive,
   a connecting rod, coupled at one end to said crank drive and at the other end to said shaft, and
   a pair of lever arms, mounted on said shaft and disposed in opposite directions, pivotably coupled to said push rods.

3. The apparatus as recited in claim 2, wherein said joint comprises,
   a first, elongated cylindrical shaft, having a vertically-disposed, fork-shaped end member affixed at one end coupled to the ends of said push rods and a transverse bolt affixed to the opposite end of said shaft perpendicular to the longitudinal axis thereof for pivotably mounting said washing elements, and
   a first vertically-disposed cylindrical bearing, pivotably coupled to said frame member, for receiving said first shaft and rotatably mounting said first shaft on said frame member.

4. The apparatus as recited in claim 3, wherein said bearing is coupled to said frame member by an elongated cylindrical bolt, having a T-shaped member at one end thereof, having a circular aperture in said member for receiving said bearing, and a forked-shaped member at the other end thereof, and
   an idler shaft, mounted on said frame member, for pivotably supporting said fork-shaped member end on said bolt, thereby pivotably coupling said bearing to said frame member.

5. The apparatus as recited in claim 4 further comprising,
   a second vertically-disposed, cylindrical bearing,
   a second elongated cylindrical shaft, rotatably disposed within said second bearing, and having a forked-shaped end member at one end, and a transverse bolt at the other end disposed perpendicular to the longitudinal axis of said second shaft for pivotably mounting said washing elements,
   at least one additional pair of push rods, coupled to said fork-shaped end members on said shafts disposed in said first and second bearings, for moving said first and second shafts and said plurality of washing elements laterally with respect to each other over the surface of the vehicle.

6. The apparatus as recited in claim 5, wherein said washing elements comprise,
   a plurality of guide rollers, rotatably mounted on said first and second shafts disposed in said bearings, and
   a plurality of endless moving belts, disposed over said guide rollers, the movement of said belts across the surface of the vehicle being independent of the vertical movement of said belts and said rollers with respect to the vehicle.

7. The apparatus as recited in claim 5, wherein said washing elements comprise a plurality of rollers, rotatably mounted on said first and second shafts disposed in said bearings, having sponge brush coverings disposed thereon for engaging and cleaning the surface of the vehicle.

8. The apparatus as recited in claim 6, further comprising,
   a plurality of first elongated cylindrical rods, each pivotably mounted at its center on and perpendicular to said transverse bolts affixed to said first and second shafts disposed in said bearings,
   a plurality of mounting shafts, pivotably coupled to the ends of said rods and disposed perpendicular thereto, for rotatably supporting said guide rollers, and
   a plurality of second elongated cylindrical rods, disposed parallel to said first rods, pivotably coupled at their ends to said guide roller mounting shafts and disposed perpendicular thereto, said rods being pivotably secured at the center portion thereof in a fixed position with respect to said longitudinal bearings, so that said mounting shafts and said rods form a parallelogram linkage for laterally reciprocating said guide rollers in opposite directions with respect to each other perpendicular to the movement of said endless washing belts.

9. The apparatus as recited in claim 8, further comprising, a plurality of idler rollers, rotatably mounted on said longitudinal bearings for supporting the upper portions of said endless belts, and a plurality of return rollers, rotatably mounted on said frame member, for supporting one of the ends of said endless belt.

10. The apparatus as recited in claim 9, further comprising, a plurality of additional second idler rollers, rotatably mounted adjacent and parallel to said guide rollers, and wherein said endless belts are U-shaped, having upper edges disposed perpendicular to the side walls of said belt, disposed over said second idler rollers, for supporting said belt.

11. The apparatus as recited in claim 10, wherein said first and second bearings and shafts are horizontally disposed, wherein said fork-shaped members on said shafts are universal joints, and wherein said reciprocating means is coupled to said cylindrical shaft mounted on said frame member by a universal joint.

* * * * *